Dec. 17, 1929.  J. A. LINDHOLM  1,739,554
VARIABLE SPEED MECHANISM
Filed Aug. 4, 1925  2 Sheets-Sheet 1

Inventor
John A. Lindholm
His Attorney

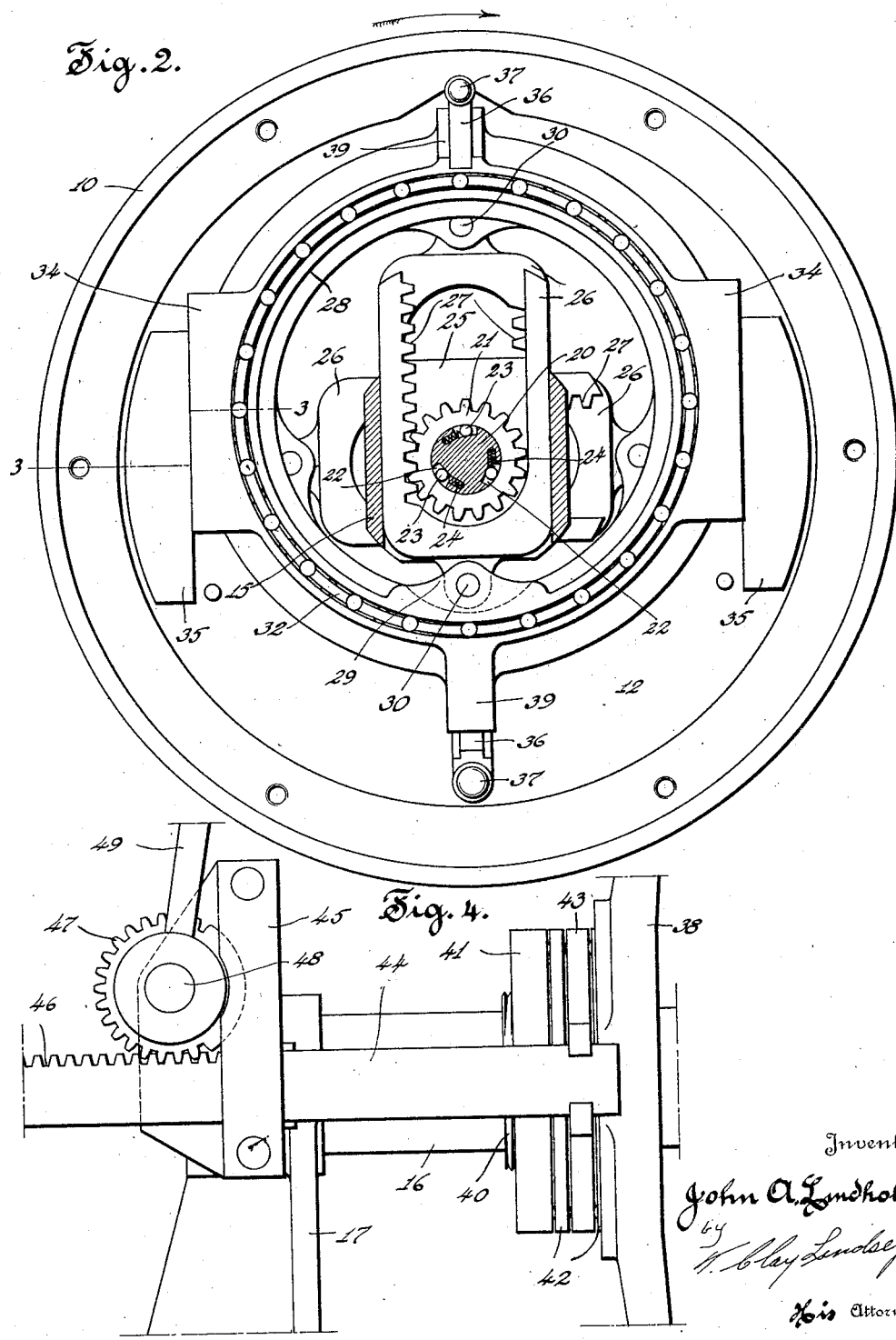

Patented Dec. 17, 1929

1,739,554

UNITED STATES PATENT OFFICE

JOHN A. LINDHOLM, OF WOLLASTON, MASSACHUSETTS

VARIABLE-SPEED MECHANISM

Application filed August 4, 1925. Serial No. 48,077.

The present invention relates to an improved variable speed driving or transmission mechanism.

An object of the present invention is to provide a transmission mechanism wherein the toothed or gear elements are intermeshed at all times, and wherein variable speeds ranging from zero to the full speed may be had while the mechanism is in operation.

Another object of the invention is to provide a transmission mechanism of this character which provides a wide range of speeds and which may be graduated with the greatest nicety to any desired extent for increasing or decreasing the same.

A further object is to provide transmission mechanism which is extremely smooth and steady in operation, vibration being reduced to a minimum and noise being entirely eliminated.

The invention also aims at the provision of a mechanism of this type which admits of compactness in the structure, accessibility to the parts, ease in assemblage and interchange of worn parts.

With the foregoing and other objects in view, the invention will be more fully described hereinafter, and will be more particularly pointed out in the claims appended hereto.

In the drawings, wherein like symbols refer to like or corresponding parts throughout the several views:

Fig. 2 is a transverse section through the same taken substantially on the line 2—2 of Fig. 1;

Fig. 4 is a side elevation of one means for effecting adjustment of the mechanism.

Figure 1:
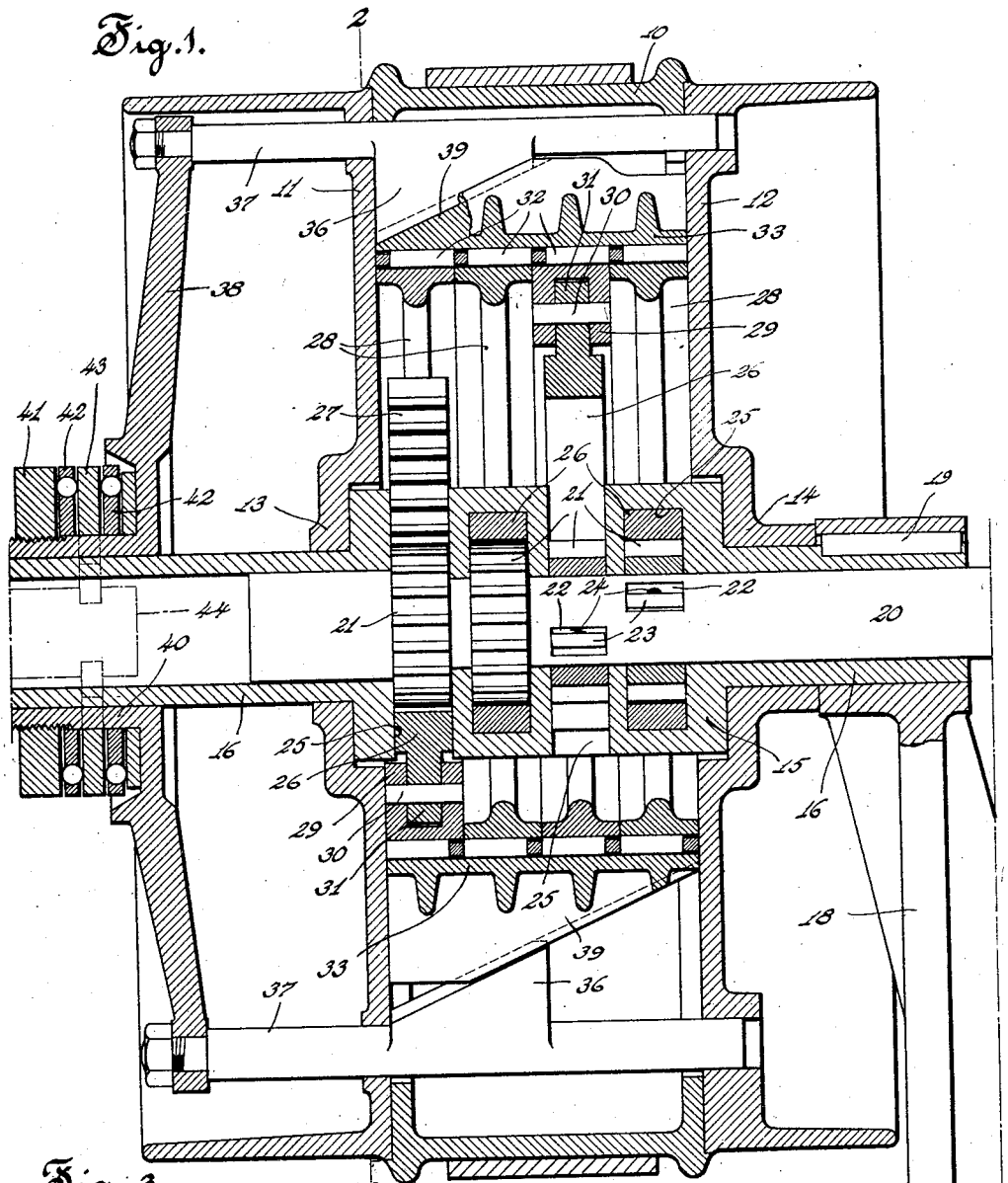
Figure 1 is a longitudinal section taken through a variable speed transmission mechanism constructed according to the present invention.
Figure 3:
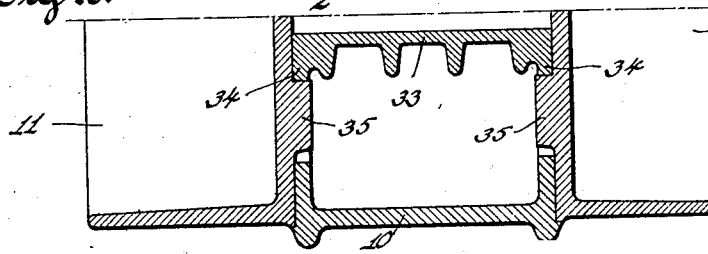
Fig. 3 is a fragmentary sectional view taken through one side of the device substantially on the line 3—3 of Fig. 2.

Referring to the drawings, the driving member, for illustrative purposes, is here shown as comprising a casing having a pulley or driving band portion 10 which is closed at opposite sides by the cupped or flanged side plates 11 and 12 arranged with their flanges extending outwardly and which may be secured to the driving band 10 by bolts or the like as is common in assembling casings and like parts.

The side plates 11 and 12 may be provided with centrally disposed and alined bearings 13 and 14 which are mounted for rotation upon the opposite ends of a fixed block or guide 15 having sleeves 16 which extend outwardly through the plates 11 and 12 for engagement in supports 17 and 18 which may be in the form of standards as shown in the present instance. The block or guide 15 is held fixedly from turning by a key 19 which interlocks the adjacent sleeve 16 to the bearing 18, and the other sleeve 16 may, in like manner, be locked to the bearing 17, if desired. A shaft 20, constituting a driven member, is mounted to freely turn in the alined sleeves 16 and is provided with a number of pinions 21, four being shown in the present instance. These pinions surround the shaft 20 within the guide block 15 and may freely rotate on the shaft in one direction only. As shown in Fig. 2, each pinion 21 is locked to the shaft 20 when moved in the other direction, the shaft 20 having peripheral recesses 22 therein for receiving each a locking roller 23. The inner walls of the recesses are inclined or eccentric, and springs 24 are seated in the recesses to engage the rollers 23 and urge them normally into a position for wedging between the pinion 21 and the shaft 20. The guide block 15 is provided in the plane of each pinion 21 with a transverse channel or guide way 25 and slidably supports therein a rack 27, one for each pinion 21.

The construction and shape of the racks 27 may be varied, as desired, but, by way of illustration, they are shown as each comprising an arm of a respective yoke 26. The arms of the yokes straddle the pinions with the racks intermeshing therewith. The guide block 15 being stationary, the racks 27 are held against turning or swinging and can only move longitudinally back and forth in the guide openings 25. The pinions 21 are each therefore turned first in one direction to grip and turn the shaft 20, and then turned in the reverse direction to release the shaft and to be carried back to initial position for obtaining a new grip upon the shaft to again advance it. As there are a number of pinions 21 mounted on the shaft, the racks are operated consecutively so as to maintain an even torque upon the shaft and to thus continuously drive it without interruption, although each individual pinion is intermittently actuated in the driving direction.

Each yoke 26 is pivoted at its outer or closed end to a respective pressure transmitting ring 28. In the present instance, each ring is provided in one side with a pair of ears 29 carrying a pivot 30 which passes through an ear 31 of the yoke 26 to pivotally connect the yoke to the ring so that the ring is free to swing into various eccentric positions about the shaft 20.

There is a ring 28 for each rack 27, and the guide openings 25 in the block 15 are arranged at suitable angles in the block for disposing the racks uniformly about the shaft 20, and in the present instance, the adjacent openings 25 are arranged at right angles to each other, so as to dispose the racks 27 ninety degrees apart about the shaft. They may be otherwise spaced. The rings 28 are surrounded by roller bearings 32 which are carried in a drive member in the form of a ring 33 which is disposed within the pulley ring or casing 10 and adapted to be moved into and out of eccentric relation thereto. The drive ring 33 surrounds all of the rings 28 and supports against its inner face the roller bearings 32 so that the drive ring 33 may rotate about the pressure transmitting rings 28 and eccentrically about the shaft 20. The drive ring 33 is provided at opposite sides with guide shoes 34 which have their outer contact faces arranged in parallelism with each other and adapted to slidably engage guides 35 carried upon the inner faces of the plates 11 and 12 so as to hold the drive ring 33 from turning within the casing 10 and to thus insure that when the casing 10 is driven, the ring 33 will be driven therewith. The guides 35 and the guide shoes 34, are given suitable length and surface area to insure a firm mounting of the driving ring 33 in the casing.

The drive ring 33 is adapted to be shifted optionally into various positions out of concentric relation with respect to the driven member or shaft 20, and this may be accomplished in any suitable manner, as by means of a pair of oppositely working cams 36 which are mounted upon rods 37 slidable transversely through the outer portions of the casing 10 and which are connected together by a yoke or spider 38 housed in one of the cupped side plates, such as the side plate 11. The cams 36 are inclined in opposite directions and cooperate with inclined projections or cams 39 carried upon the opposite sides of the driving ring 33, the projections 39 of course being disposed intermediate of the guide shoes 34, so that the cams 36 may slide the ring 33 directly back and forth upon the guides 35.

The spider 38 may, of course, be actuated in any suitable manner, but as best shown in Fig. 4 may be provided with a hub 40 slidable upon the fixed sleeve 16. The hub has a threaded collar 41 on its outer end to retain suitable bearings 42 between which is interposed a coupling collar 43 or the like forked at opposite sides to receive a shifting bar 44 or the like which is slidable lengthwise of the shaft 20. The adjacent bearing 17 may support a guide 45 through which the bar 44 is moved, and the bar may have rack teeth 46 meshing with a pinion 47 on the shaft 48 which may be turned in opposite directions by a handle 49 or the like. The movement of the shifting bars 44 thus moves the oppositely formed cams 36 longitudinally of the casing 10 to slide the drive ring 33 diametrically in the casing into the desired position. When the drive ring 33 is disposed concentric to the shaft 20 or in the intermediate position, no motion will be transmitted through the mechanism. However, as soon as the drive ring 33 is moved off center, the drive ring, as it is turned, shifts the pressure transmitting rings 28 into consecutive eccentric positions, so as to reciprocate the racks through the guide block 15 and to consequently turn the pinions 21 to a more or less extent. When the drive ring 33 is shifted to its extreme eccentric position, the yokes 26 have a full throw during the eccentric movement of their rings 28, and consequently the parts may be so proportioned that the shaft 20 may be driven at substantially the same speed of rotation as the casing 10. By varying the position of the cams 36, a gradual increasing or diminishing ratio of turning may be effected between the pulley band or casing 10 and the shaft 20.

The structure is such that the parts may be made strong and durable and have ample bearing surfaces which may be provided with anti-friction means or the like so as to reduce frictional contact and thus provide a practical transmission mechanism capable of heavy or light duty. The shaft 20 may, of course, be connected to any mechanism to be driven and by providing four racks with their respective pinions 21, a continuous turning of the shaft is provided. Of course, the number of racks and pinions may be increased or diminished according to the result and strength desired and to adapt the transmission mechanism to the purposes at hand.

It is obvious that various changes and modifications may be made in the details of construction and design of the above specifically described embodiment of this invention without departing from the spirit thereof, such changes and modifications being restricted only by the scope of the following claims.

I claim as my invention:

1. In variable speed mechanism, a rotatable driven member, and a rotatable drive member thereabout having a part mounted for relative eccentric adjustment, one-way clutch pinions on said driven member and racks mounted for movement in a fixed path and meshing with said pinions and associated with said drive member so as to be reciprocated thereby when the drive member is rotated and eccentric to said driven member.

2. In variable speed mechanism, a rotatable driven member, and a rotatable drive member thereabout having a part mounted for eccentric adjustment relative thereto, one-way clutch pinions on said driven member, angularly spaced racks one for each pinion and constantly meshing therewith, said racks being supported against rotary movement and for reciprocating movement, operative connections between said drive member and racks through which said drive member reciprocates said racks, and means for adjusting said drive member.

3. In variable speed mechanism, a driven shaft, and a drive ring thereabout having a part mounted for eccentric adjustment relative thereto, one-way clutch pinions on said shaft, and racks mounted for movement in a fixed path and meshing with said pinions and associated therewith so as to be reciprocated by said drive ring when the latter is rotated and eccentric to said shaft.

4. In variable speed mechanism, a rotatable driven member and a rotatable drive member thereabout and having a part mounted for eccentric adjustment relative thereto, one-way clutch pinions on said driven member, racks mounted for movement in a fixed path and meshing with said pinions, non-rotatable rings respectively connected to said racks and mounted in said drive member, and means for adjusting said drive member part relative to said driven member.

5. In variable speed mechanism, a driven shaft, a drive ring thereabout, means for mounting said ring for eccentric adjustment relative to said shaft, one-way clutch pinions on said shaft, racks mounted for movement in a fixed path and meshing with said pinions, and rings respectively connected to said racks and located rotatably in said drive ring.

6. In variable speed mechanism, a driven shaft, a drive ring thereabout, means for supporting said ring for eccentric adjustment relative to said shaft, one-way clutch pinions on said shaft, racks mounted for movement in a fixed path and meshing with said pinions, rings respectively connected to said racks and located in said drive ring, and bearings between said drive ring and the rings connected to said racks.

7. In variable speed mechanism, a rotatable driven member, a rotatable driving member, a rotatable drive member about said driven member and driven in unison with said driving member, means for supporting said member eccentrically with respect to said driven member, one-way clutch pinions on said driven member, racks mounted for movement in a fixed path and meshing with said pinions and associated with said driving member for reciprocation thereby when the latter is driving member thereby when the latter is rotated and eccentric to said driven member, and means for adjusting said drive member relative to said driving member.

8. In variable speed mechanism, a driven shaft, a driving member comprising a casing, a drive ring about said shaft and mounted for eccentric adjustment in said casing, one-way clutch pinions on said shaft, racks mounted for movement in a fixed path and meshing with said pinions, a plurality of rings rotatably mounted within said drive ring and respectively connected to said racks, and means for adjusting said drive ring relative to said casing.

9. In variable speed mechanism, a driving member adapted to be rotated, a shaft arranged concentrically within said member, one-way clutch pinions mounted on the shaft, racks for the pinions, a stationary guide member for slidably and non-rotatably maintaining the racks in definite relations with respect to each other, and transmitting means connected with and adjustably disposed between said racks and the driving member and adjustable for reciprocating said racks through said guide member during the rotation of the driving member.

10. In variable speed mechanism, a driving member adapted to be rotated, a drive ring, means for supporting said ring for eccentric adjustment in said member, a plurality of pressure transmitting rings arranged in the drive ring, rack bars connected to said pressure transmitting rings, a shaft mounted concentrically in the driving member, one-way clutch pinions mounted on said shaft, one for each rack and intermeshing therewith, and a fixed guide member for maintaining said racks and their respective pressure transmitting rings from rotating.

11. In variable speed mechanism, a driving member, a driven member concentric within the driving member, a drive ring mounted for adjustment out of concentric relation to the shaft and within the driving member, a plurality of pressure transmitting rings mounted in the drive ring, a rack bar pivotally connected to each pressure transmitting ring and mounted for movement in a fixed path, and a one-way clutch pinion upon the driven member for each rack bar.

12. In variable speed mechanism, a driving member, a driven member, a fixed guide member about the driven member, a plurality of angularly disposed racks movable through the guide member, pinions on the driven member one for each rack and connected for operation in one direction with the driven member, a pressure transmitting device connected to each rack, and a drive ring supporting said pressure transmitting devices and adjustably mounted in said driving member for regulating the throw of the racks and for transmitting reciprocating motion thereto from the eccentric movement of the drive ring about the driven member.

13. In variable speed mechanism, a driving member, a driven member, a plurality of pressure transmitting rings arranged about the driven member, an independent driving connection between each pressure transmitting ring and the driven member to operate the same in one direction, a drive ring supporting said pressure transmitting rings, a diametrically sliding connection between the drive ring and the driving member, and cam means disposed between the drive ring and the driving member for moving the drive ring into various positions off center with respect to the driving member.

14. In variable speed mechanism, a fixed guide, a driven shaft journalled therein, a casing rotatably supported by said guide, a drive ring mounted in said casing for radial adjustment, oppositely acting cams between said casing and ring for eccentrically adjusting the latter, one-way pinions on said shaft, a plurality of racks angularly disposed with respect to one another and constantly meshing with said pinions respectively and supported by said fixed guide against rotary and for reciprocating movement, a plurality of rings within said drive ring and respectively connected to said racks, bearings between each of said rings and said drive ring, and means for adjusting said cams.

JOHN A. LINDHOLM.